May 27, 1924.
J. A. MELLOTT
CAGE TRAP
Filed Oct. 29, 1923
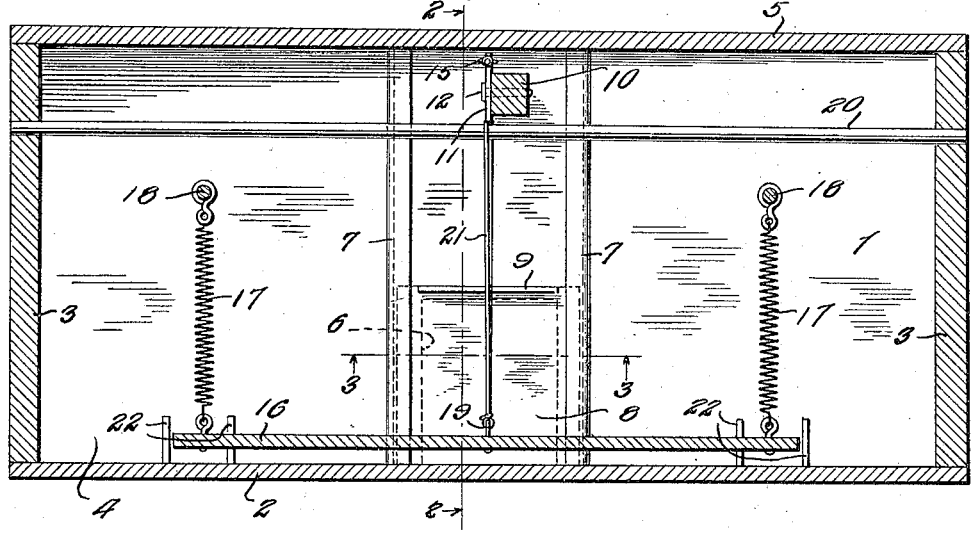
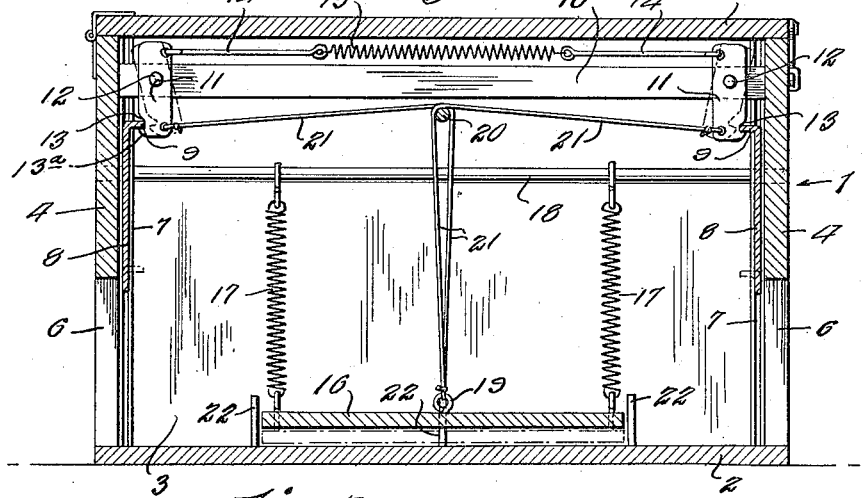
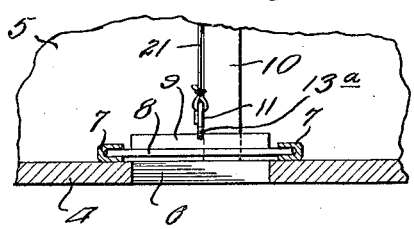
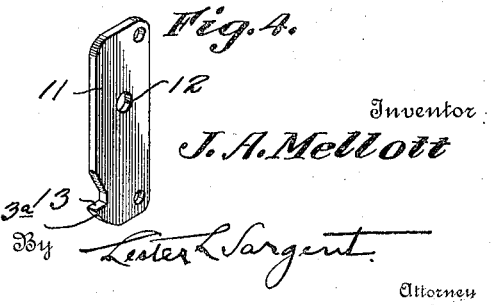
Inventor
J. A. Mellott
By Lester L. Sargent
Attorney Patented May 27, 1924.

1,495,607

UNITED STATES PATENT OFFICE.

JAMES A. MELLOTT, OF BEAVER CITY, NEBRASKA.

CAGE TRAP.

Application filed October 29, 1923. Serial No. 671,424.

*To all whom it may concern:*

Be it known that I, JAMES A. MELLOTT, a citizen of the United States, residing at Beaver City, in the county of Furnas and State of Nebraska, have invented a new and useful Cage Trap, of which the following is a specification.

The object of my invention is to provide a novel cage trap adapted for catching rats and mice; and to provide the novel combination and arrangement of parts disclosed in the accompanying drawings, in which:—

Figure 1 is a longitudinal section through the invention;

Fig. 2 is a transverse section on line 2—2 of Fig. 1;

Fig. 3 is a horizontal section on line 3—3 of Fig. 1; and

Fig. 4 is a detail perspective view of member 11.

Like characters of reference indicate like parts in each of the several views.

Referring to the accompanying drawings, I provide a suitable box or cage 1 consisting of bottom 2, ends 3, sides 4 and hinge top 5. In the sides 4 I provide suitable door openings 6 of suitable size to admit the animals to be trapped. On either side of these door openings I provide vertical guide channels 7 in which are slidably mounted the gravity operated doors 8, which doors have inturned top edge portions 9. I provide a cross beam 10 extending transversely across the cage near the top and over the doors 8. Mounted on this cross beam by means of pivot 12 is a trigger 11 which is provided with a notch 13 in its lower outer edge portion and an inclined portion 13$^a$ extending underneath the notched portion of the trigger. I provide suitable rods (or cords) 14 attached to the upper portions of triggers 11, these members 14 being connected by a suitable resilient element such as spring 15. Attached to the lower portion of triggers 11 are flexible cables 21 of any suitable material, each of which extends over a central rounded rod 20 which extends longitudinally of the cage and provides a bearing member over which the cables operate. Cables 21 are attached to an eye 19 affixed to the center of platform 16, which platform is normally held in spaced relation from the floor 2 of the cage by suitable resilient means, such as springs 17, which are hooked over transverse rods 18. I also provide vertical guide members or posts 22 for platform 16.

It is, of course, within the contemplation of my invention to provide more than one pair of doors and more than one pair of operating means for said doors, duplicating the arrangement disclosed in the accompanying drawings, the operation of the device being the same as above described and as illustrated. The cage may be made either in a small size for mice or in a larger size for rats.

In use, some article of food that will attract animals is placed on platform 16 and when the rats or mice enter the door 6 and step on the platform 16, their weight will depress it, causing the cables 21 to pull the triggers 11 out of their engagement with the inturned ends 9 of doors 8, allowing those doors to drop and entrap the animals in the cage. The hinged cover 5 is opened to reset the trap, which is done by hand.

What I claim is:—

1. A cage trap consisting of a cage having a hinged cover and having a pair of oppositely arranged doors, a platform spaced above the floor and resiliently suspended in the cage, triggers pivotally mounted in the upper portion of the cage and having notches in their outer edge portions, cables operatively connecting the platform with the lower portions of said triggers, gravity operated doors adapted to be held in a releasable elevated position by means of the notched triggers, and resilient means normally holding the triggers in a position to support the doors in their elevated position.

2. In combination with the apparatus described in claim 1, the said triggers having an inclined bottom portion extending below the notched portions to permit of sliding engagement with the top portions of the doors when same are raised to cause the triggers to move on their pivots while moving into position to engage the tops of the doors to hold the same in operative position.

3. In a cage trap, the combination of a cage having a resiliently supported platform normally held in spaced relation above the floor of the cage, means for supporting a door in vertical slidable position, a vertical slidable door having an inturned edge portion, a notched trigger, the notched portion of which is adapted to releasably engage and support the door in raised position, a cable operatively connecting the lower end of the trigger with the platform, and means resiliently holding the trigger in operative but releasable engagement with the inturned edge of the door.

4. In a cage trap, the combination of a cage having one or more pairs of door openings arranged in opposite sides of the cage, vertical door guiding channels arranged on either side of the doors, vertical slidable gravity operated doors mounted in said channels, pivotally mounted triggers releasably engaging the upper edges of said doors, a platform resiliently supported in spaced relation above the top of the floor of the cage, flexible cable means operatively connecting the lower portions of the triggers with the platform, a rod extending longitudinally of the cage and over which each of the cables travels and is guided, and resilient means operatively connecting the upper portions of the triggers and normally holding them in operative engagement with the doors to hold the doors in elevated position until released by the weight of an animal on the resiliently supported platform, substantially as set forth.

JAMES A. MELLOTT.